A. C. ADAMS.
MUD GUARD FOR MOTOR AND OTHER VEHICLES.
APPLICATION FILED MAR. 4, 1916.
1,227,026.
Patented May 22, 1917.
2 SHEETS—SHEET 1.
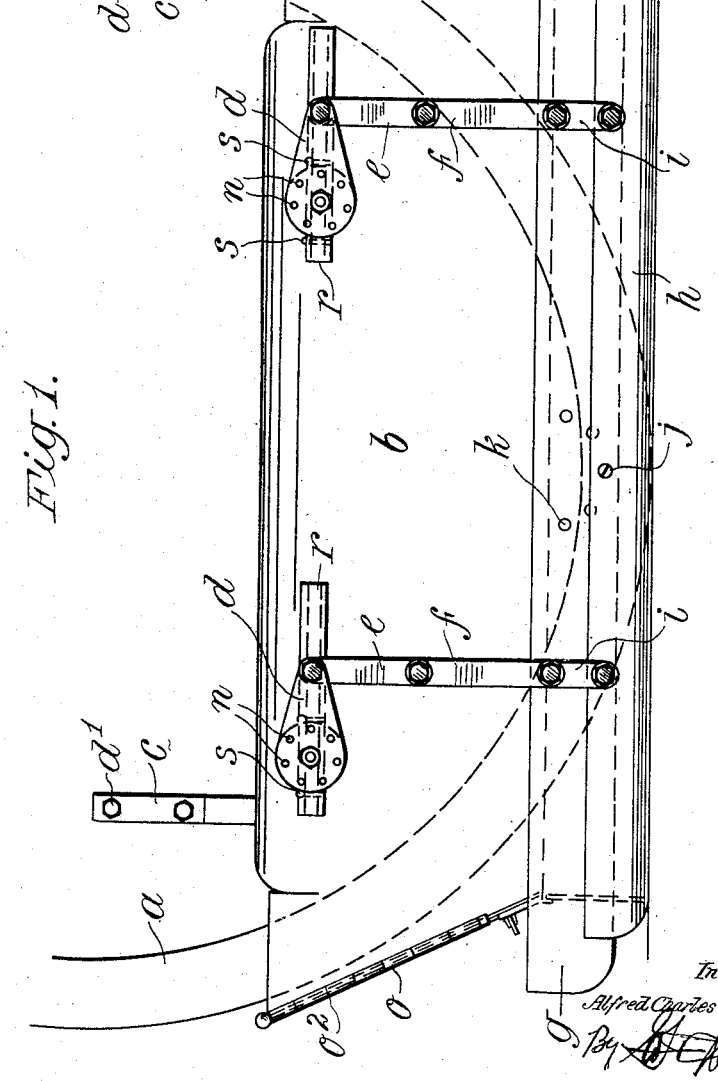
Inventor:
Alfred Charles Adams.

A. C. ADAMS.
MUD GUARD FOR MOTOR AND OTHER VEHICLES.
APPLICATION FILED MAR. 4, 1916.
1,227,026.
Patented May 22, 1917.
2 SHEETS—SHEET 2.
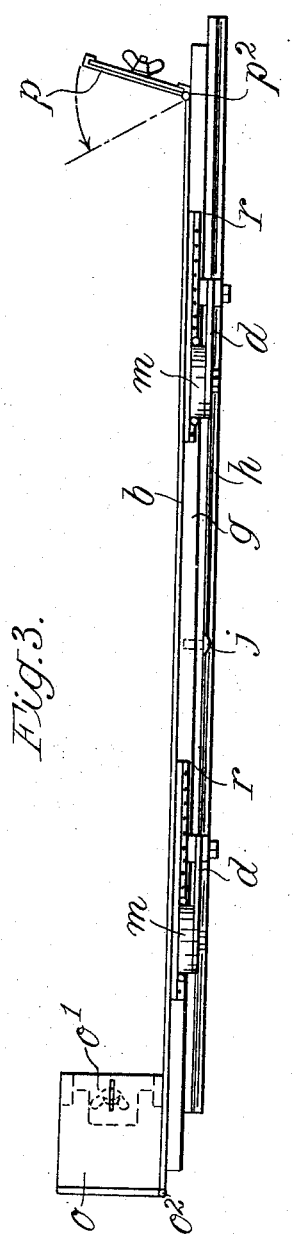
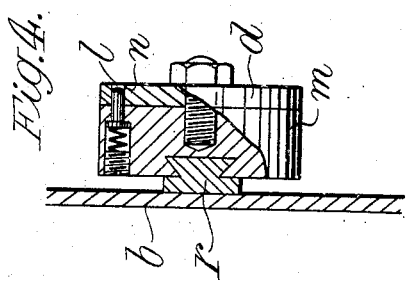
Inventor,
Alfred Charles Adams.
Attorney

UNITED STATES PATENT OFFICE.

ALFRED CHARLES ADAMS, OF PECKHAM, LONDON, ENGLAND.

MUD-GUARD FOR MOTOR AND OTHER VEHICLES.

1,227,026.            Specification of Letters Patent.      Patented May 22, 1917.

Application filed March 4, 1916. Serial No. 82,133.

*To all whom it may concern:*

Be it known that I, ALFRED CHARLES ADAMS, a subject of His Majesty the King of England, residing at Peckham, in the county of London, Kingdom of England, have invented certain new and useful Improvements in Mud-Guards for Motor and other Vehicles, of which the following is a specification.

This invention relates to improvements in mud guards for motor and other vehicles and it has for its object to provide a device which is particularly adapted for use in connection with tramcars or other vehicles.

In order that the present invention may be clearly understood and more readily carried into effect it is hereinafter described with reference to the accompanying drawings in which:—

Figure 1 is a front elevation showing the improved guard applied to a tramcar wheel;

Fig. 2 is an end elevation thereof;

Fig. 3 is a plan view; and

Fig. 4 is a detail sectional view hereinafter referred to.

According to the present invention I provide each wheel $a$ of the vehicle, or each pair or more thereof, with a main or longitudinal guard plate $b$ of metal or other suitable material which is conveniently supported in position by bracket plates or straps $c$ and tightening bolts $d'$ adapted to engage around the frame of the wheel carriage or bogie as the case may be. This main guard $b$ may if desired be suitably shaped at its front and rear ends.

From this main guard plate $b$ I suspend by means of a plurality of adjustable arms $d$ and freely jointed links $e$ and $f$, another or second guard plate $g$ which is free to swing in a forward and backward direction and move vertically on the outside of the main guard plate $b$. From this swinging guard plate $g$ is also adjustably suspended a further or third guard plate $h$ which may if desired be of a more flexible nature.

The connection between the first two guard plates $b$ and $g$ is effected by means of the pair of adjustable arms $d$ on the main guard which are connected at their extremities to the aforesaid jointed links $e$ $f$ supporting the second guard plate $g$. Each of the lower links $f$ is also in its turn pivotally connected to the second guard plate $g$ and to the pivot of a link $i$ which carries the lower or third guard plate $h$. Adjustment of the third guard plate $h$ on the second one $g$ is effected by means of a screw or stud $j$ which passes through the lower plate and enters into one of the spaced holes $k$ provided in the second guard plate $g$. Adjustment of the second guard plates $g$ on the first $b$ is effected as shown in Figs. 1 and 4 by means of spring controlled pins $l$ which are disposed in bosses $m$ on the plate $b$ and adapted to enter one of a series of holes $n$ provided in bosses at the ends of the arms $d$ while the bosses $m$ are also adjustable along dove-tail keys $r$ on the guard $b$ and can be held in any adjusted position by means of split pins placed through the keys on each side of the boss.

At the rear end and in some cases also at the front end of the main guard $b$ I also provide a bent or return guard $o$ $p$ which may conveniently be formed of a relatively fixed body portion and an adjustable lower flap or section $o'$ $p'$ respectively, these return guards being hinged as shown at $o^2$ $p^2$ to the main guard and being held in place by friction or by any suitable fastening means.

If desired in the case of a motor road vehicle the link mechanism may be arranged on the inside of the main guard so as to be protected from damage should the vehicle skid into the curb and in such cases side rollers may also be provided on the guard if desired.

By these means it will be appreciated I am enabled to provide a guard which can be adjusted to the wheels of the vehicle as the wheel tires wear away.

What I claim is:—

1. A mudguard for motor and other vehicles comprising in combination, a main guard plate, relatively fixed bosses on said main guard plate, adjustable arms mounted on the said bosses, links pivotally connected at their upper ends to said adjustable arms, and an auxiliary guard plate suspended from the adjustable arms by the said links, substantially as described.

2. A mudguard for motor and other vehicles comprising in combination, a main guard plate, relatively fixed bosses on said main guard plate, adjustable arms mounted on said bosses, links pivotally connected at their upper ends to said adjustable arms, and a plurality of auxiliary guard plates suspended from the adjustable arms by said links, substantially as described.

3. A mudguard for motor and other vehicles comprising in combination, a main guard plate, longitudinally adjustable bosses on said guard plate, rotatably adjustable arms mounted on said bosses, links pivotally connected at their upper ends to said adjustable arms, and an auxiliary guard plate suspended from the adjustable arms by the said links, substantially as described.

4. A mud guard for motor and other vehicles, comprising a main guard plate, a plurality of auxiliary guard plates adjustably connected to the main guard plate and located in the same vertical plane thereof, and front and rear guard plates normally located at right angles to the main guard plate and pivoted thereto.

In testimony whereof I have hereunto signed this specification.

ALFRED CHARLES ADAMS.